United States Patent
Boeck

(10) Patent No.: US 6,568,688 B1
(45) Date of Patent: May 27, 2003

(54) HYDRAULIC SEAL ARRANGEMENT, MORE PARTICULARLY ON A GAS TURBINE

(75) Inventor: Alexander Boeck, Zossen (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/550,309

(22) Filed: Apr. 14, 2000

(30) Foreign Application Priority Data

Apr. 14, 1999 (DE) .......................... 199 16 803

(51) Int. Cl.⁷ ............................. F16J 15/447
(52) U.S. Cl. ................ 277/411; 277/418; 277/427; 277/429; 277/431
(58) Field of Search .................. 277/411, 412, 277/418, 419, 420, 423, 427, 429, 431, 432

(56) References Cited

U.S. PATENT DOCUMENTS

| | | | |
|---|---|---|---|
| 822,802 A | * 6/1906 | Wilkinson | 277/431 |
| 2,284,465 A | * 5/1942 | Wood | 277/427 |
| 2,573,425 A | 10/1951 | Fletcher | |
| 2,960,356 A | 11/1960 | Tyce et al. | |
| 3,765,688 A | 10/1973 | Junker | |
| 3,880,434 A | 4/1975 | Echard et al. | |
| 4,795,167 A | * 1/1989 | Otsuka | 277/427 |
| 5,984,630 A | * 11/1999 | Di Salle et al. | 277/418 |
| 6,155,574 A | * 12/2000 | Borgstrom et al. | 277/419 |
| 6,170,832 B1 | * 1/2001 | Ernst | 277/412 |

FOREIGN PATENT DOCUMENTS

| | | |
|---|---|---|
| DE | 25 59 667 | 11/1977 |
| DE | 3328057 | 2/1984 |
| DE | 3328057 A1 | 2/1984 |
| FR | 2621970 | 4/1989 |
| GB | 848601 | 9/1960 |
| GB | 1212593 | 11/1970 |
| GB | 1284596 | 8/1972 |
| GB | 2125118 | 2/1984 |

* cited by examiner

*Primary Examiner*—Anthony Knight
*Assistant Examiner*—Enoch E Peavey
(74) *Attorney, Agent, or Firm*—Davidson Berquist Klima & Jackson LLP

(57) ABSTRACT

This invention relates to a hydraulic seal arrangement between two, more particularly co-rotating shafts of especially a gas turbine engine, where the radially outer shaft when viewed with reference to the shafts' axis of rotation has an annulus extending radially outward along its circumference into which the radially inner shaft when viewed with reference to the shafts' axis of rotation projects with a web that extends radially outward across its circumference, and which annulus can through an inlet area be filled siphon-fashion under centrifugal effect with a hydraulic medium at least in the area of the free end of the web when the shaft(s) is (are) rotating. In accordance with the present invention, means are provided for exhausting part of the hydraulic medium, said means branching off from an annulus area that is farthest away from the inlet area. In this manner the hydraulic medium in the annulus is continuously being renewed, so that even in a hot environment, coking of the hydraulic medium, here oil taken from the engine's oil circuit, is prevented.

10 Claims, 1 Drawing Sheet

HYDRAULIC SEAL ARRANGEMENT, MORE PARTICULARLY ON A GAS TURBINE

Figure 1:
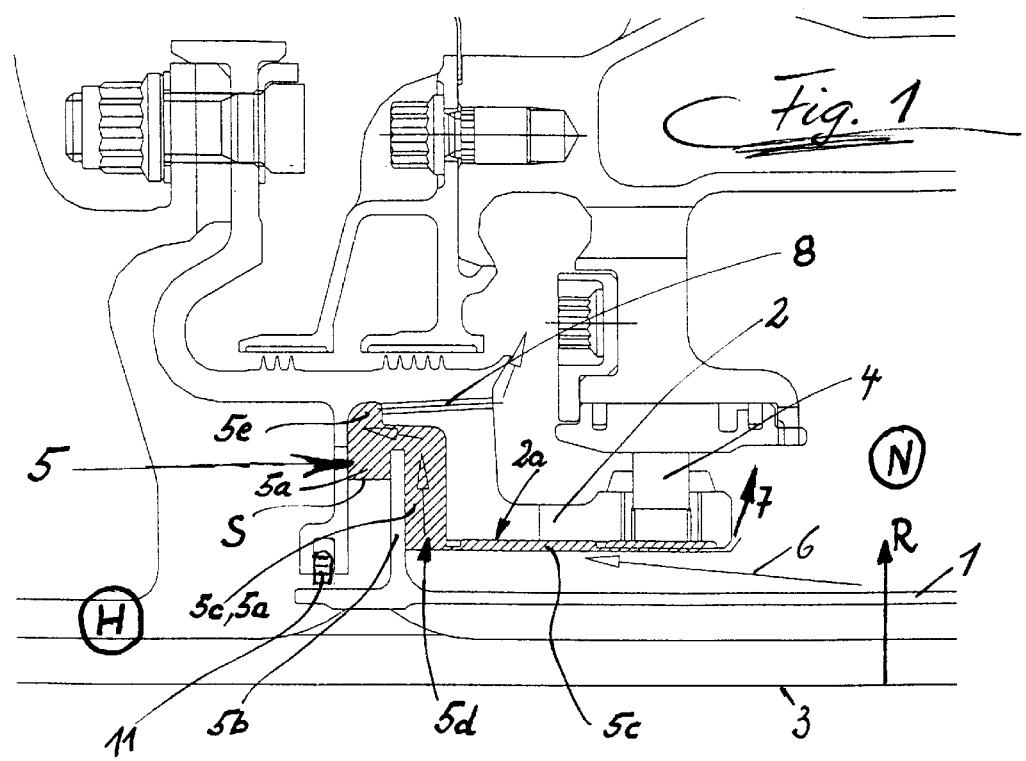

This invention relates to a hydraulic seal arrangement between two, more particularly co-rotating shafts of especially a gas turbine engine, where the radially outer shaft when viewed with reference to the shafts' axis of rotation has an annulus extending radially outward along its circumference into which the radially inner shaft when viewed with reference to the shafts' axis of rotation projects with a web that extends radially outward across its circumference, and which annulus can through an inlet area be filled siphon-fashion under centrifugal effect with a hydraulic medium at least in the area of the free end of the web when the shaft(s) is (are) rotating. For technically associated patents, reference is made to DE 33 28 057 A1.

Hydraulic seals between two rotating shafts where a hydraulic medium is introduced under centrifugal force between a web of an inner shaft and an annulus of an outer shaft, also called "centrifugal-force siphons", have long been known as noncontacting, nonleaking seals. They are especially suitable for sealing shafts in relative motion one to the other. For this purpose, a hydraulic medium, more particularly oil from the oil circuit of the machine, more particularly a gas turbine engine containing the shafts, is ducted into said annulus where it forms a barrier under the centrifugal force produced by the rotation of the shaft(s).

No problems are encountered when such a simple, but very effective hydraulic seal is used in a relatively cool environment. But when such a seal according to the generic part of claim 1 is used in a relatively hot environment, where the shaft material in the region of said annulus may heat to around 500° C., also the hydraulic medium (oil) would heat to this temperature and sooner or later inevitably begin to carbonize (coke). The resulting, at least partial hardening of the hydraulic medium and the associated adherence of coked oil on the walls confining the annulus or siphon obviously no longer ensure reliable sealing action.

In a broad aspect of the present invention, means is provided with which a hydraulic seal between two rotating shafts where a hydraulic medium is introduced under centrifugal force between a web of an inner shaft and an annulus of an outer shaft can be used also in a relatively hot environment.

It is a particular object of the present invention to provide an arrangement in which a means, branching off from an annulus area essentially farthest away from the inlet area, is provided for exhausting part of the hydraulic medium. In a preferred aspect, the inlet area of the annulus is provided at a point lying as far inside as possible, viewed radially, whereas the annulus area containing the exhaust means for the hydraulic medium is situated as far outside as possible, viewed radially, and close to that side of the annulus that lies opposite the inlet area. Further advantageous aspects of the present invention will become apparent from the following description.

In accordance with the present invention, continuous flow of hydraulic medium through the annulus forming the siphon is ensured when at least part of the hydraulic medium in the annulus is continuously exhausted and, naturally, replaced, or refilled, which requires that the annulus / siphon can essentially continuously be filled with hydraulic medium. As a result, fresh and hence relatively cold oil or hydraulic medium continuously enters the annulus/siphon, while hydraulic medium already heated by the environment is (partially, but preferably fully) exhausted from it. Accordingly, oil or hydraulic medium will not stay long enough in the annulus to carbonize. Simultaneously, the continuous flow of hydraulic medium through the annulus causes sufficient heat to be dissipated from the containing walls of the annulus to cool them, so that, again, the risk of coking is eliminated. Locating the means to exhaust at least some of the hydraulic medium in an area that is essentially farthest away from the inlet area makes sure that the hydraulic medium in the annulus is at least cooled as best as possible, if not even fully replaced, by the continuous inflow of hydraulic medium.

Design options to bleed off some of the hydraulic medium from the annulus or siphon may take several different forms. Two preferred embodiments are shown in respective partial sectional views in the accompanying FIGS. 1 and 2 and are described more fully below. On the drawings, the reference numerals refer to the same components respectively.

Reference numeral 1 indicates the first shaft and reference numeral 2 the second shaft of a two-shaft gas turbine aircraft engine, the two shafts rotating at different speeds (but preferably in the same sense of rotation) about the axis of rotation 3 of the engine. These shafts 1 and 2, here shown only in partial view, are conventionally arranged concentrically relative to one another, with the first shaft 1, or low-pressure shaft, arranged inside the second shaft 2, or high-pressure shaft. Reference numeral 4 indicates the movable bearing of high-pressure shaft 2.

Arranged on the right-hand side of movable bearing 4 and, viewed in radial direction R (which extends normal to rotational axis 3),outside of shaft 2 is a relatively low-pressure area N of the gas turbine interior, while arranged to the left side of expansion bearing 4 and, viewed in radial direction R, inside shaft 2, is a relatively high-pressure area H. The two areas N and H must effectively be sealed one from the other, for which purpose a hydraulic seal arrangement generally indicated by the numeral 5 is provided between the two shafts 1 and 2.

This hydraulic seal arrangement 5 is essentially formed by an annulus 5a which is provided in the interior of the outer shaft 2 and extends radially outwards in the direction R across the circumference of shaft 2. Projecting into this annulus 5a is a web 5b which is arranged on the inner shaft 1 and extends again radially outwards in direction R across the circumference of shaft 1. A large portion of annulus 5a and especially that portion of it which surrounds the free end of web 5b is filled or being filled with oil (from the engine's oil circuit) or generally with a hydraulic medium 5c (indicated by the hatched area). The filling is done through an inlet area 5d.

Through this annular inlet area 5d, located at the right-hand side of web 5b, hydraulic medium 5c, which in the form of an oil jet introduced between the two shafts 1, 2 in the direction of arrowhead 6 is also used to lubricate movable bearing 4, reaches annulus 5a in the manner described below: Owing to the rotation of the two shafts 1, 2 and the resulting centrifugal effect, hydraulic medium 5c, introduced in the direction of arrowhead 6 as shown, collects on the inner wall 2a of the outer shaft 2, said inner wall lying radially outside with respect to the space between shafts 1 and 2. Hydraulic medium 5c in this manner enters, again under centrifugal effect, also annulus 5a provided in shaft 2, said annulus lying much further outward, when viewed in radial direction R, relative to that area of inner wall 2a in which hydraulic medium 5c is introduced in the direction of arrowhead 6. In the process, hydraulic medium 5c collects in annulus 5a to both the left and the right sides of web 5b, creating an optimum siphon-type hydraulic seal as shown.

On the left side of web 5b, or on that side of web 5b which faces area H, the surface or liquid level S of hydraulic medium 5c naturally reaches further out radially than on the right side of web 5b, for the reason that said right-hand area of web 5b communicates with area N, in which the pressure is considerably less than in area H. Also, through the right-hand free end section of shaft 2, excessive hydraulic medium 5c, which owing to the pressure difference between areas H and N in annulus 5a is prevented from reaching the left-hand side of web 5b, can be exhausted in the direction of arrowhead 7, so that reference numeral 7 practically indicates a spill of hydraulic seal arrangement 5.

As initially mentioned, such a hydraulic seal arrangement 5 is basically reliable, but only when environmental temperatures are relatively low, so that there is no risk of coking of hydraulic medium 5c, which in this application is oil taken from the gas turbine engine's oil circuit. But in that area of a gas turbine in which the hydraulic seal arrangement 5 as here described and explained is provided, temperatures are relatively high. More particularly, the material of the shafts 1, 2 in this area picks up much heat, posing a risk inasmuch as the hydraulic medium 5c in annulus 5a may heat up enough to start coking.

To prevent coking, the two embodiments of the present invention provide means for exhausting some of the hydraulic medium 5c from annulus 5a, said means (differing in detail arrangement) being arranged in an annulus area 5e that essentially is farthest away from inlet area 5d. In order to achieve optimal flooding of the so-called siphon or annulus 5a with hydraulic medium 5c that is continuously being supplied through the inlet area 5d to replace the amount of hydraulic medium 5c being exhausted from annulus area 5e, inlet area 5d of annulus 5a is in each embodiment located as far inside as possible, when viewed in radial direction R, whereas said annulus area 5e having exhaust means for the hydraulic medium is located as far outside as possible, when viewed in radial direction R, and close to that side of annulus 5a that lies opposite the inlet area 5d.

In the embodiment of FIG. 1, said means for exhausting part of the hydraulic medium 5c takes the shape of at least one outlet duct 8 that passes through outer shaft 2 in essentially the direction of rotation axis 3 and is somewhat inclined in a radially outward direction. Through this outlet duct 8 a certain amount of hydraulic medium 5c is continuously exhausted from annulus area 5e. Continuous refilling of annulus 5a is achieved as above described through the inlet area 5d by means of an oil jet following the direction of arrow head 6.

As previously explained ahead of the description of the two preferred embodiments, fresh and hence relatively cold oil or hydraulic medium 5c reaches the annulus 5a (or the siphon of the hydraulic seal arrangement 5), while part of the hydraulic medium 5c in annulus 5a, heated by the environment, is being exhausted through the outlet duct 8. The oil, or hydraulic medium 5c accordingly remains in annulus 5a for too short a period of time to coke. Simultaneously, the essentially continuous flow of hydraulic medium 5c through the annulus 5a causes the containing walls of annulus 5a to dissipate sufficient heat to cool these and avert the risk of coking from this source as well. In a preferred aspect of the present invention, therefore, the cross-sectional area of outlet duct 8 is selected such that the entire hydraulic medium 5c present in annulus 5a is renewed within a second.

Figure 2:
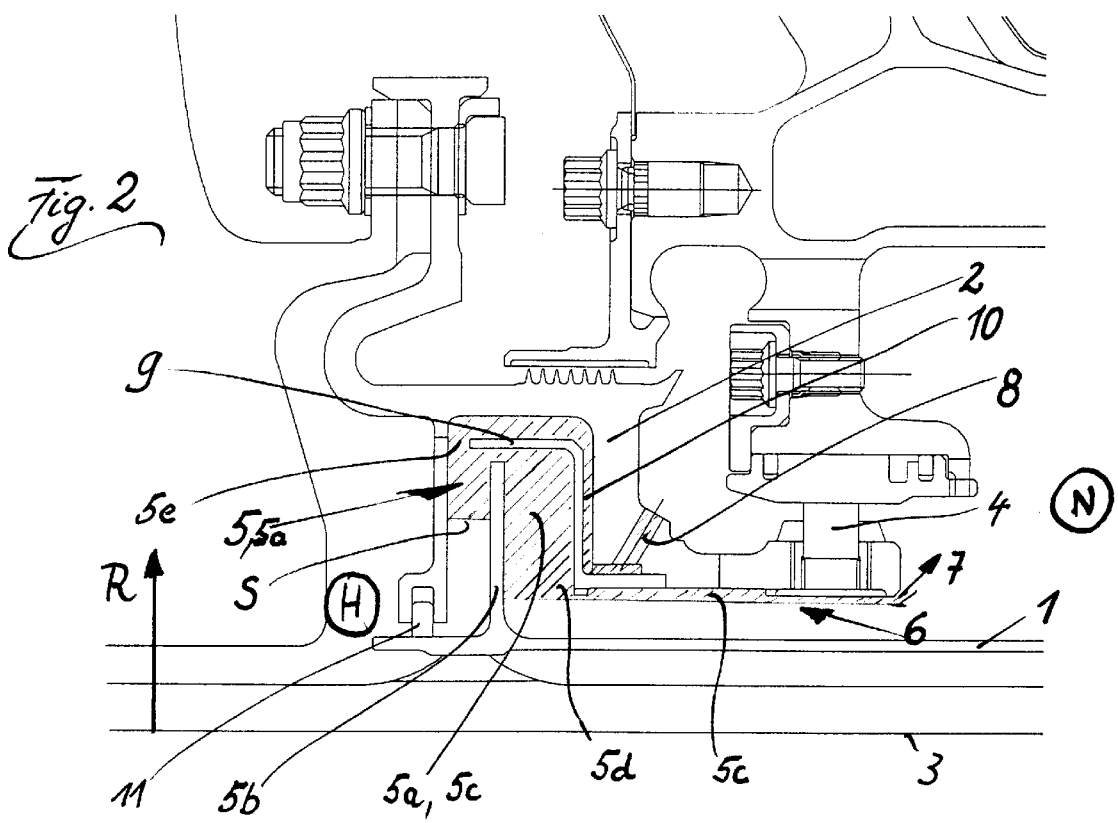

In the embodiment of FIG. 2, said means for exhausting part of the hydraulic medium 5c takes the shape of scoop plate 9 which also begins in said annulus area 5e and essentially follows the wall contour of annulus 5a at a small distance therefrom to duct the hydraulic medium 5c through a gap 10 formed by said distance into a radially further inward area from which an outlet duct 8 branches off which passes through outer shaft 2 and leads to the outside in an essentially radial direction R.

As it will become apparent from the embodiment of FIG. 2, outlet duct 8 and gap 10 both have a larger cross-sectional area than the outlet duct 8 of the embodiment according to FIG. 1. In this manner the embodiment of FIG. 2 prevents outlet duct 8 from clogging, which under adverse conditions might happen in the embodiment in accordance with FIG. 1. On the other hand, in the embodiment in accordance with FIG. 1, the cross-sectional area of outlet duct 8 should not be excessively large, so that the amount of hydraulic medium 5c remaining in annulus 5a will always be sufficient (for the desired sealing action). Since in the embodiment in accordance with FIG. 2 outlet duct 8 lies further inward, when viewed in radial direction R, than in the embodiment in accordance with FIG. 1, the free flow area of outlet duct 8 (and of gap 10) can as a result of the lower centrifugal action naturally be wider in FIG. 2 than in FIG. 1.

In both embodiments, outlet duct 8 issues into area N of the gas turbine interior, where the pressure is relatively low. In this arrangement said area H of the gas turbine interior, in which the pressure is relatively high, is sealed off from area N, or from annulus 5a, by hydraulic seal arrangement 5 and additionally by a seal ring 11 (taking the form of a piston ring for example) arranged between the two shafts 1, 2. This seal ring 11, however, will be effective only when shafts 1, 2 are standing still, whereas when shafts 1, 2 are rotating, the sealing action is prevented by centrifugal effects, so that hydraulic seal arrangement 5 is needed. Generally, a plurality of design or other details may deviate from the embodiments shown without detracting from the substance of the patent claims.

LIST OF REFERENCE NUMERALS

1 (first, inner) shaft
2 (second, outer) shaft
2a inner wall (of 2)
3 axis of rotation
4 movable bearing
5 hydraulic seal arrangement
5a annulus (in 2)
5b web (on 1)
5c hydraulic medium
5d inlet area (of 5a)
5e annulus area (with exhaust means)
6 direction of arrow head: oil jet
7 direction of arrow head: spill
8 outlet duct
9 scoop plate
10 gap (between 9 and 2)
11 seal ring (between 1 and 2)
N (relatively) low-pressure area of gas turbine interior
H (relatively) high-pressure area of gas turbine interior
R radial direction
S liquid level, or surface of 5c in 5a

What is claimed is:
1. Hydraulic seal arrangement (5) between two coaxially rotating shafts (1, 2) of a gas turbine engine, where the radially outer shaft (2) when viewed with reference to the shafts' axis of rotation (3) has an annulus (5a) extending radially outward along its circumference into which the radially inner shaft (1) when viewed with reference to the shafts' axis of rotation (3) projects with a web (5b) that extends radially outward across its circumference, and which annulus (5a) can through an inlet area (5d) be filled siphon-fashion under centrifugal effect with a hydraulic medium (5c) at least in the area of the free end of the web (5b) when the shafts are rotating, wherein means are provided for exhausting some of the hydraulic medium (5c), said means branching off from an annulus area (5e) that essentially lies radially outwardmost from the inlet area (5d).

2. Hydraulic seal arrangement in accordance with claim 1, characterized in that the inlet area (5d) of the annulus (5a) is arranged as far inward as possible when viewed in radial direction (R), whereas the annulus area (5e) containing the exhaust means for the hydraulic medium (5c) is arranged as far outward as possible when viewed in radial direction (R) and close to that side of the annulus (5a) which lies opposite the inlet area (5d).

3. Hydraulic seal arrangement in accordance with claim 2, characterized in that the means for exhausting part of the hydraulic medium (5c) takes the shape of at least one outlet duct (8) passing through the outer shaft (2) in essentially the direction of rotation axis (3) and having a slight radially outward inclination.

4. Hydraulic seal arrangement in accordance with claim 2, characterized in that the means for exhausting part of the hydraulic medium (5c) takes the shape of a scoop plate (9) which begins in said annulus area (5e) and essentially follows the wall contour of the annulus (5a) at a small distance therefrom to duct the hydraulic medium (5c) through the gap (10) formed by the distance into a radially further inward area, from which an outlet duct (8) branches off which passes through the outer shaft (2) to the outside in an essentially radial direction (R).

5. Hydraulic seal arrangement in accordance with claim 2, characterized in that the outlet duct (8) issues into a relatively low-pressure area (N) of the gas turbine interior, whereas a relatively high-pressure area (H) of the gas turbine interior is additionally sealed off from the annulus (5a) by means of a sealing ring (11) arranged between the shafts (1, 2).

6. Hydraulic seal arrangement in accordance with claim 1, characterized in that the means for exhausting part of the hydraulic medium (5c) takes the shape of at least one outlet duct (8) passing through the outer shaft (2) in essentially the direction of rotation axis (3) and having a slight radially outward inclination.

7. Hydraulic seal arrangement in accordance with claim 6, characterized in that the outlet duct (8) issues into a relatively low-pressure area (N) of the gas turbine interior, whereas a relatively high-pressure area (H) of the gas turbine interior is additionally sealed off from the annulus (5a) by means of a sealing ring (11) arranged between the shafts (1, 2).

8. Hydraulic seal arrangement in accordance with claim 1, characterized in that the means for exhausting part of the hydraulic medium (5c) takes the shape of a scoop plate (9) which begins in said annulus area (5e) and essentially follows the wall contour of the annulus (5a) at a small distance therefrom to duct the hydraulic medium (5c) through the gap (10) formed by the distance into a radially further inward area, from which an outlet duct (8) branches off which passes through the outer shaft (2) to the outside in an essentially radial direction (R).

9. Hydraulic seal arrangement in accordance with claim 8, characterized in that the outlet duct (8) issues into a relatively low-pressure area (N) of the gas turbine interior, whereas a relatively high-pressure area (H) of the gas turbine interior is additionally sealed off from the annulus (5a) by means of a sealing ring (11) arranged between the shafts (1, 2).

10. Hydraulic seal arrangement in accordance with claim 1, characterized in that the outlet duct (8) issues into a relatively low-pressure area (N) of the gas turbine interior, whereas a relatively high-pressure area (H) of the gas turbine interior is additionally sealed off from the annulus (5a) by means of a sealing ring (11) arranged between the shafts (1, 2).

* * * * *